(12) United States Patent
Chen et al.

(10) Patent No.: US 9,525,326 B2
(45) Date of Patent: Dec. 20, 2016

(54) BRUSH-LESS MOTOR

(71) Applicant: CHANGZHOU GLOBE CO., LTD., Changzhou, Jiangsu (CN)

(72) Inventors: Yin Chen, Changzhou (CN); Ranran Xia, Changzhou (CN); Qiang Wang, Changzhou (CN)

(73) Assignee: CHANGZHOU GLOBE CO., LTD., Changzhou (CN)

( * ) Notice: Subject to any disclaimer, the term of this patent is extended or adjusted under 35 U.S.C. 154(b) by 0 days.

(21) Appl. No.: 14/718,076

(22) Filed: May 20, 2015

(65) Prior Publication Data

US 2015/0256053 A1  Sep. 10, 2015

Related U.S. Application Data

(63) Continuation of application No. PCT/CN2013/001376, filed on Nov. 13, 2013.

(30) Foreign Application Priority Data

Dec. 3, 2012  (CN) .......................... 2012 1 0506043

(51) Int. Cl.
*H02K 11/00* (2016.01)
*H02K 9/06* (2006.01)

(52) U.S. Cl.
CPC ........... *H02K 11/0073* (2013.01); *H02K 11/33* (2016.01); *H02K 9/06* (2013.01); *H02K 2211/03* (2013.01)

(58) Field of Classification Search
USPC ............ 310/156.61, 400, 406, 407, 410, 50
See application file for complete search history.

(56) References Cited

U.S. PATENT DOCUMENTS 4,156,168 A * 5/1979 Vogel ..................... H02K 11/33
310/156.12
5,061,869 A * 10/1991 Stewart, Sr. ............. H02K 5/00
310/89

(Continued)

FOREIGN PATENT DOCUMENTS

CN         2402054 Y       10/2000
CN         2938545 Y        8/2007

(Continued)

OTHER PUBLICATIONS

International Search Report of PCT Patent Application No. PCT/CN2013/001376 issued on Jan. 30, 2014.

(Continued)

*Primary Examiner* — Naishadh Desai

(57) ABSTRACT

A brush-less motor is disclosed, comprising a stator, a rotor, a plurality of field-effect tubes, a commutation circuit board, a control circuit board and a motor end cap, wherein the motor end cap comprises a front end cap and a rear end cap which are mutually fixedly connected to form an integrated motor; the plurality of field-effect tubes is directly fixed at the motor front end cap; the commutation circuit board and the control circuit board are both connected to the motor front end cap. The field-effect tubes of the brush-less motor are directly installed on a housing of the motor, ensuring good heat dissipation, saving heat sinks and cost; the integrated brush-less motor runs more smoothly and imposes requirements which are not as high as those imposed by the split brush-less motor on the accuracy of the housing. Thus, the reject ratio of products during batch production is reduced.

5 Claims, 2 Drawing Sheets

(56) References Cited

U.S. PATENT DOCUMENTS

| | | | | |
|---|---|---|---|---|
| 5,654,599 | A * | 8/1997 | Casper | H02K 29/08 310/237 |
| 6,661,148 | B2 * | 12/2003 | Oomori | H02K 9/06 310/239 |
| 6,663,362 | B1 * | 12/2003 | Lentz | H02K 1/145 310/253 |
| 7,009,318 | B2 * | 3/2006 | Iritani | F04B 35/04 310/52 |
| 2005/0082921 | A1 * | 4/2005 | Schurter | H02K 1/185 310/58 |
| 2005/0275307 | A1 * | 12/2005 | Chavez | H02K 7/003 310/261.1 |
| 2008/0185993 | A1 * | 8/2008 | Johnson | H01M 2/1055 320/118 |
| 2010/0083456 | A1 * | 4/2010 | Norell | A47L 9/2831 15/347 |
| 2010/0283332 | A1 * | 11/2010 | Toukairin | B25F 5/008 310/50 |
| 2011/0171887 | A1 * | 7/2011 | Tanimoto | B24B 23/028 451/359 |
| 2011/0227430 | A1 * | 9/2011 | Omori | B25F 5/00 310/50 |
| 2012/0098391 | A1 * | 4/2012 | Yamasaki | B62D 5/0406 310/68 D |

FOREIGN PATENT DOCUMENTS

| | | |
|---|---|---|
| CN | 101373907 A | 2/2009 |
| CN | 101636250 A | 1/2010 |
| JP | 6121507 A | 4/1994 |

OTHER PUBLICATIONS

1st Office Action of counterpart Chinese Patent Application No. 201210506043.8 issued on Jun. 5, 2014.

* cited by examiner

BRUSH-LESS MOTOR

CROSS REFERENCE TO RELATED APPLICATIONS

The present application is a Continuation Application of PCT application No. PCT/CN2013/001376 filed on Nov. 13, 2013, which claims the benefit of Chinese Patent Application No. 201210506043.8 filed on Dec. 3, 2012. All the above are hereby incorporated by reference.

BACKGROUND OF THE INVENTION

1. Technical Field

The present invention relates to a brush-less motor, in particular to a brush-less motor for gardening tools and electric tools.

2. Description of Related Art

In the design of traditional gardening tools and electric tools, motors are split. Motors can rotate only after being located by the plastic housing and rear cap of the gardening tools and electric tools, which imposes very high requirements for the accuracy of the plastic housing and the rear cap; otherwise, the motors generate large noise or large working current and dissipate heat quickly during rotation, affecting the service life of the motors.

Besides, in the traditional design, the plurality of field-effect tubes is disposed on individual heat sinks, increasing the cost. The heat sinks are not disposed on the dissipation air path of the motor, so the heat dissipation effect is not good, and the performance of the field-effect tubes is affected.

SUMMARY OF THE INVENTION

The present invention mainly solves the technical problem of providing a brush-less motor, which can ensure that the assembling process is simpler, require low requirements for accuracy of the plastic housings of the gardening tools and electric tools, and reduce the reject ratio. The field-effect tubes are directly installed on the housing of the motor, ensuring good heat dissipating and also saving a heat sink and saving cost.

The present invention provides a brush-less motor, comprising a stator, a rotor, a plurality of field-effect tubes, a commutation circuit board, a control circuit board, and a motor end cap; the stator and the rotor are disposed in the motor end cap; the plurality of field-effect tubes is connected to the motor end cap; the commutation circuit board and the control circuit board are both connected to the motor end cap; the motor end cap comprises a front end cap and a rear end cap; the motor front end cap and the motor rear end cap are mutually fixedly connected to form an integrated brush-less motor.

Preferably, the plurality of field-effect tubes is directly fixed on the motor front end cap, and the field-effect tubes are also connected to the control circuit board.

Preferably, the commutation circuit board and the control circuit board are both connected to the motor front end cap.

Preferably, the field-effect tubes are fixed and locked on the motor front end cap through screws.

Preferably, the front end cap and the motor rear end cap are fixedly connected through bolts.

Preferably, the center of the brush-less motor is provided with a motor mandrel, and the brush-less motor is connected to a gearbox assembly through the motor mandrel.

Preferably, one side of the motor mandrel close to the motor rear end cap is connected with a motor fan.

Preferably, the brush-less motor is internally formed with a dissipating air path, and the field-effect tubes are disposed on the dissipating air path.

Preferably, the dissipating air path includes an air inlet and air outlet, and the field-effect tubes are disposed on the side of the air inlet.

Preferably, the air inlet comprises an upper air inlet, a lower air inlet, left and right air inlets disposed on the motor front end cap, and the air outlet comprises left and right air outlets disposed on the two sides of the motor rear end cap.

The present invention has the beneficial effects of: the brush-less motor ensures good heat dissipation, saves heat sinks and cost; the integrated brush-less motor runs more smoothly, and imposes requirements which are not as high as those imposed by the split brush-less motor on the accuracy of the housing, and thus the reject ratio of products during batch production is reduced.

Figure 1:
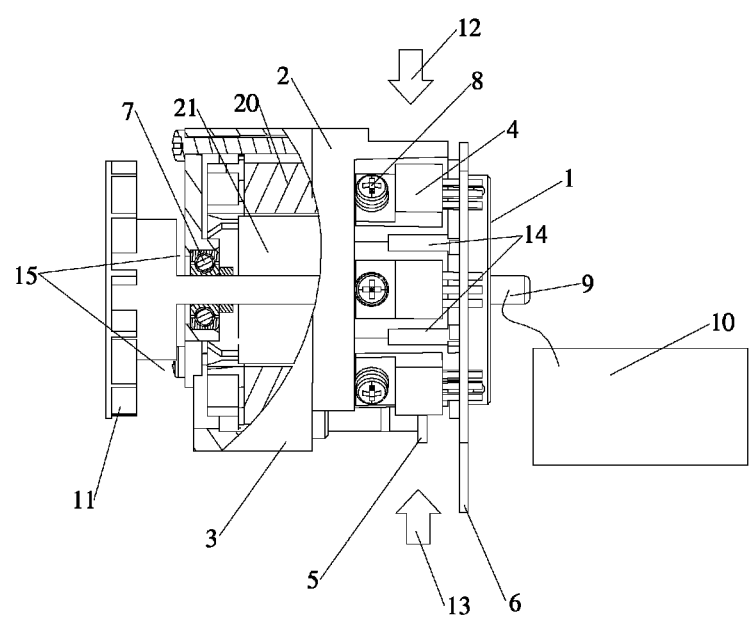
FIG. 1 is a structural view of a brush-less motor of the present invention.

Marks of parts in the figures are as follows: 1. brush-less motor, 2. motor front end cap, 3. motor rear end cap, 4. field-effect tube, 5. commutation circuit board, 6. control circuit board, 7. bolt, 8. screw, 9. motor mandrel, 10. gearbox assembly, 11. motor fan, 12. upper air inlet, 13. lower air inlet, 14. left and right air inlets, 15. left and right air outlets, 16. first air inlet, 17. second air inlet, 18. first air outlet, 19. second air outlet, 20. stator, 21. rotor.

DETAILED DESCRIPTION OF THE INVENTION

The preferable embodiments are described in detail with reference to the attached drawings such that those skilled in this field can more easily understand the advantages and characteristics of the present invention to more clearly define the protective scope of the present invention.

Refer to figurers 1-2. An embodiment of the present invention includes:

A brush-less motor comprises a brush-less motor 1. The brush-less motor 1 comprises a stator 20, a rotor 21, a plurality of field-effect tubes 4, a commutation circuit board 5, a control circuit board 6, and a motor end cap.

The stator 20 and the rotor 21 are disposed in the motor end cap. The plurality of field-effect tubes 4 is connected to the motor end cap. The field-effect tubes 4 are also connected to the control circuit board 6. The commutation circuit board 5 and the control circuit board 6 are both connected to the motor end cap.

The motor end cap comprises a front end cap 2 and a rear end cap 3. The motor front end cap 2 and the motor rear end cap 3 are mutually fixedly connected.

The motor front end cap 2 and the motor rear end cap 3 are fixedly connected through a bolt 7. The plurality of field-effect tubes 4 are directly fixed on the motor front end cap 2. The commutation circuit board 5 and the control circuit board 6 are both connected to the motor front end cap 2.

In the present invention, the brush-less motor 1 is integrated, thus ensuring that the assembling is simpler when the brush-less motor applies to the gardening tools and electric tools, lowering the requirements imposed on the accuracy of the plastic housings of the gardening tools and electric tools, and reducing the reject ratio. The brush-less motor can detect if the motor is good condition, for example if there are noises, before being installed in the machine, thus improving the working efficiency.

In the present invention, the plurality of field-effect tubes is directly fixed and locked at the motor front end cap 2 through screws 8, which means that the large-power field-effect tubes 4 on the control circuit of the brush-less motor can be directly installed on the housing of the motor, thus ensuring good heat dissipation and also saving a heat sink and cost.

The center of the brush-less motor 1 is provided with a motor mandrel 9. The brush-less motor 1 is connected to a gearbox assembly 10 through the motor mandrel 9. The brush-less motor 1 drives the electric tool to work normally through the gearbox assembly 10.

One side of the motor mandrel 9 close to the motor rear end cap 3 is connected with a motor fan 11, capable of ensuring good heat dissipation of the brush-less motor.

Furthermore, the brush-less motor 1 is internally provided with a dissipating air path. The large-power field-effect tubes 6 are disposed on the dissipating air path, ensuring direct dissipation of the field-effect tubes.

Specifically, the dissipating air path comprises an air inlet and an air outlet.

Wherein, the motor front end cap 2 is provided with an upper air inlet 12 and a lower air inlet 13 on the upper and lower sides; the motor front end cap is provided with left and right air inlets 14 on the left and right sides; the motor rear end cap 3 is provided with left and right air outlets 15 on two sides; and thus, the dissipating air path is formed thereamong.

The whole dissipating air path can ensure not only direct radiation of the field-effect tube 4 but also efficient radiation of the brush-less motor, prolong the service life of the brush-less motor, and improve the use efficiency of the brush-less motor.

Figure 2:
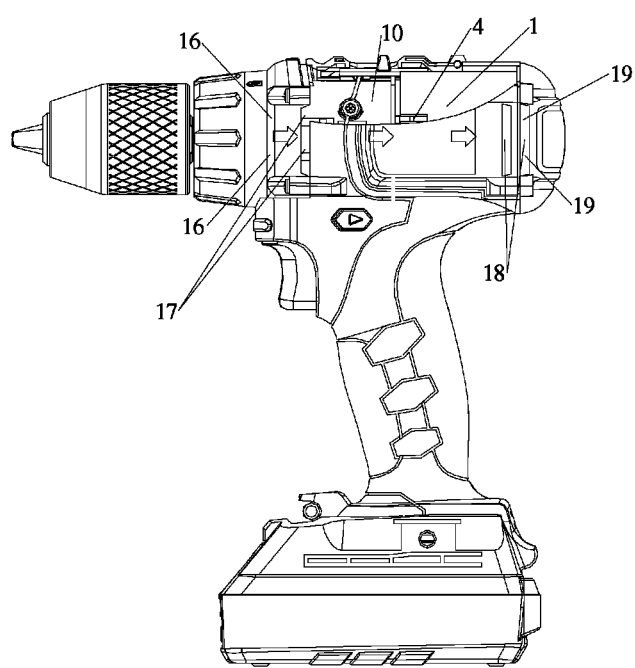
FIG. 2 is a structural view of a preferable embodiment, in which the brush-less motor of the present invention applies to an electric drill.

FIG. 2 shows a structural view of the brush-less motor applied to an electric drill.

Wherein, the brush-less motor 1 is connected to the gearbox assembly 10, and the brush-less motor 1 drives an electric drill to work through the gearbox assembly 10. In the brush-less motor 1, six field-effect tubes 4 are disposed on the housing of the motor.

The brush-less motor 1 is integrated, ensuring simpler assembling with the electric drill, lowering the requirements for the accuracy of the plastic housing of the electric drill, and reducing the reject ratio.

The front end of the machine body of the electric drill is provided with first air inlets 16 on two sides, while the front end of the machine body is also provided with second air inlets 17 on the upper and lower sides; the rear end of the machine body is provided with first air outlets 18 on two sides, and the rear end of the machine body is provided with second air outlets 19 on the upper and lower sides.

The first air inlets 16, the second air inlets 17, the first air outlets 18 and the second air outlets 19 form a dissipating air path. The effect-field tubes 4 are disposed on the dissipating air path, ensuring good heat dissipation effect of the field-effect tubes, the brush-less motor and the electric drill, and prolonging the service life of the electric drill.

The brush-less motor of the present invention has the beneficial effects of:

the assembly is simpler when the brush-less motor is used on the gardening tools and electric tools; the integrated brush-less motor runs more smoothly, and imposes requirements which are not as high as those imposed by the split brush-less motor on the accuracy of the housing, and thus the reject ratio of products during batch production is reduced;

the field-effect tubes are directly installed on the motor housing, not only ensuring good heat dissipation, but also saving a heat sink and saving cost;

the large-power field-effect tubes are also disposed on the dissipating air path, ensuring the direct heat dissipation of the field-effect tubes and the efficient heat dissipation of the brush-less motor, prolonging the service life of the brush-less motor and improving the use efficiency of the brush-less motor.

The above are only some embodiments of the present invention and shall not be regarded as limit to the present invention. Any equivalent structure or equivalent flow modifications made on the basis of the description and attached drawings of the present invention, or director or indirect application to other related fields, shall fall within the protective scope of the present invention.

What is claimed is:

1. A brush-less motor, comprising a stator, a rotor, a plurality of field-effect transistors, a commutation circuit board, a control circuit board and a motor end cap; the stator and the rotor are disposed in the motor end cap; the plurality of field-effect transistors is connected to the motor end cap; the commutation circuit board and the control circuit board are both connected to the motor end cap, characterized in that, the motor end cap comprises a front end cap and a rear end cap; the motor front end cap and the motor rear end cap are mutually fixedly connected to form an integrated brush-less motor; the center of the brush-less motor is provided with a motor mandrel, and the brush-less motor is connected to a gearbox assembly through the motor mandrel; one side of the motor mandrel close to the motor rear end cap is connected with a motor fan; the brush-less motor is internally formed with a dissipating air path, and the field-effect transistors are disposed on the dissipating air path; the dissipating air path includes an air inlet and air outlet, and the field-effect transistors are disposed on the side of the air inlet; and the air inlet comprises an upper air inlet, a lower air inlet, left and right air inlets disposed on the motor front end cap, and the air outlet comprises left and right air outlets disposed on the two sides of the motor rear end cap.

2. The brush-less motor according to claim 1, characterized in that, the plurality of field-effect transistors is directly fixed on the motor front end cap, and the field-effect transistors are also connected to the control circuit board.

3. The brush-less motor according to claim 1, characterized in that, the commutation circuit board and the control circuit board are both connected to the motor front end cap.

4. The brush-less motor according to claim 2, characterized in that, the field-effect transistors are fixed and locked on the motor front end cap through screws.

5. The brush-less motor according to claim 1, characterized in that, the front end cap and the motor rear end cap are fixedly connected through bolts.

* * * * *